United States Patent
Lee et al.

(10) Patent No.: US 11,603,584 B2
(45) Date of Patent: Mar. 14, 2023

(54) FERRITIC ALLOY AND METHOD OF MANUFACTURING NUCLEAR FUEL CLADDING TUBE USING THE SAME

(71) Applicants: Sung Yong Lee, Daejeon (KR); Hun Jang, Sejong-si (KR); Seung Jae Lee, Daejeon (KR); Yoon Ho Kim, Daejeon (KR); Dae Gyun Ko, Daejeon (KR); Changheui Jang, Daejeon (KR); Chaewon Kim, Gyeonggi-do (KR); Hyunmyung Kim, Seoul (KR)

(72) Inventors: Sung Yong Lee, Daejeon (KR); Hun Jang, Sejong-si (KR); Seung Jae Lee, Daejeon (KR); Yoon Ho Kim, Daejeon (KR); Dae Gyun Ko, Daejeon (KR); Changheui Jang, Daejeon (KR); Chaewon Kim, Gyeonggi-do (KR); Hyunmyung Kim, Seoul (KR)

(73) Assignees: KEPCO NUCLEAR FUEL CO., LTD., Daejeon (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 2 days.

(21) Appl. No.: 16/799,612

(22) Filed: Feb. 24, 2020

(65) Prior Publication Data

US 2021/0189534 A1  Jun. 24, 2021

(30) Foreign Application Priority Data

Dec. 18, 2019  (KR) .................. 10-2019-0169560

(51) Int. Cl.
*C22C 38/40* (2006.01)
*C22C 38/00* (2006.01)
(Continued)

(52) U.S. Cl.
CPC .............. *C22C 38/40* (2013.01); *C21D 8/105* (2013.01); *C22C 38/005* (2013.01); *C22C 38/04* (2013.01); *C22C 38/06* (2013.01)

(58) Field of Classification Search
CPC ........ C22C 38/40; C22C 38/005; C22C 38/04; C22C 38/06
(Continued)

(56) References Cited

U.S. PATENT DOCUMENTS 4,671,826 A   6/1987  Prizzi
9,284,629 B2  3/2016  Foster et al.
(Continued)

FOREIGN PATENT DOCUMENTS

CN   107177780 A    9/2017
EP   0 198 570 A2  10/1986
(Continued)

OTHER PUBLICATIONS

Kenichi et al., JPH 0694585 B2 machine translation, Nov. 1994, entire translation (Year: 1994).*
(Continued)

*Primary Examiner* — Humera N. Sheikh
*Assistant Examiner* — Katherine A Christy
(74) *Attorney, Agent, or Firm* — Reinhart Boerner Van Deuren P.C.

(57) ABSTRACT

Embodiments of the disclosure relate to a ferritic alloy having excellent ability to withstand nuclear power plant accidents and a method of manufacturing a nuclear fuel cladding tube using the same. The alloy includes iron (Fe), aluminum (Al), chromium (Cr), and nickel (Ni). The nickel (Ni) may be included 0.5 to 10 wt % based on a total amount of the alloy. The chromium may be included 13 to 18 wt %
(Continued)

based on the total amount of the alloy. The aluminum may be included 5 to 7 wt % based on the total amount of the alloy.

10 Claims, 9 Drawing Sheets

(51) Int. Cl.
    *C22C 38/04*     (2006.01)
    *C22C 38/06*     (2006.01)
    *C21D 8/10*     (2006.01)

(58) Field of Classification Search
    USPC .......................................................... 428/544
    See application file for complete search history.

(56) References Cited

U.S. PATENT DOCUMENTS

| | | | |
|---|---|---|---|
| 2002/0124913 A1* | 9/2002 | Uehara | C22C 38/004 148/325 |
| 2011/0189496 A1* | 8/2011 | Hahn | C22C 38/40 428/546 |
| 2012/0124913 A1 | 5/2012 | Haun et al. | |
| 2018/0066331 A1 | 3/2018 | Ponsiluoma et al. | |
| 2019/0264307 A1 | 8/2019 | Yamamoto et al. | |

FOREIGN PATENT DOCUMENTS

| | | | | |
|---|---|---|---|---|
| EP | 0 219 089 | A2 | | 4/1987 |
| EP | 0 534 164 | A2 | | 3/1993 |
| JP | S63186853 | A | | 8/1988 |
| JP | H01287252 | A | | 11/1989 |
| JP | H03138334 | A | | 6/1991 |
| JP | H0694585 | B2 | * | 11/1994 ........... H04L 12/423 |
| JP | H09263906 | A | | 10/1997 |
| JP | 3410303 | B2 | * | 5/2003 |
| JP | 2008-122309 | A | | 5/2008 |
| JP | 2011-528752 | A | | 11/2011 |
| JP | 2011528752 | A | * | 6/2014 |
| JP | 2014-198900 | A | | 10/2014 |
| JP | 2015-168883 | A | | 9/2015 |
| JP | 2016204709 | A | * | 12/2016 |
| KR | 1020130098619 | A | | 9/2013 |
| WO | WO 03/029505 | A1 | | 4/2003 |
| WO | WO 2009/045136 | A1 | | 4/2009 |

OTHER PUBLICATIONS

Hayashi et al, JP 2016204709 A machine translation, Dec. 8, 2016, entire translation (Year: 2016).*

Inoue, JP 3410303 B2 Google Patents Translation, May 26, 2003, entire translation (Year: 2003).*

Sano et al., "Laser Peening without Coating as a Surface Enhancement Technology", 2006, JLMN—Journal of Laser Micro/Nanoengineering vol. 1, No. 3, URL: <http://www.jlps.gr.jp/jlmn/assets/b2600f5749ff5a61a49860bddaf37b2a.pdf>, pp. 161-166 (Year: 2006).*

* cited by examiner

FERRITIC ALLOY AND METHOD OF MANUFACTURING NUCLEAR FUEL CLADDING TUBE USING THE SAME

CROSS REFERENCE TO RELATED APPLICATION

The present application claims priority based on Korean Patent Application No. 10-2019-0169560, filed Dec. 18, 2019, the entire content of which is incorporated herein for all purposes by this reference.

BACKGROUND OF THE INVENTION

Field of the Invention

The present invention relates to a ferritic alloy having excellent ability to withstand nuclear power plant accidents, and a method of manufacturing a nuclear fuel cladding tube using the same.

Description of the Related Art

In the case of nuclear power plants, zirconium alloys have been used for about 60 years as materials of nuclear fuel cladding tubes. The zirconium alloy used for the nuclear fuel cladding tube may generate a large amount of hydrogen due to the very high oxidation rate thereof at high temperatures, causing a serious accident due to the explosion of hydrogen.

As a method of overcoming the shortcomings of a zirconium alloy in the event of a nuclear power plant accident to thus ensure safety, a method of replacing a tube material for covering a nuclear-fuel sintered pellet with an alloy having an excellent high-temperature-oxidation characteristic may be selected. The replacement with the alloy serves to reduce the rate of oxidation and the amount of generated hydrogen in the high-temperature steam environment that is folioed when a nuclear power plant accident occurs.

Since the nuclear power plant accident in Fukushima, academic, research, and industrial fields around the world have conducted research to replace a zirconium cladding tube with various materials. Examples of materials for use in research include a coating material of chromium or a chromium alloy applied on the outer surface of a zirconium alloy cladding tube, a zirconium-molybdenum-coated multi-structured material, a FeCrAl material based on iron and including chromium and aluminum, and a silicon carbide composite material.

The coating material of chromium or chromium alloy applied on the outer surface of zirconium has excellent applicability to a conventional nuclear power plant and also has excellent high-temperature oxidation resistance due to a chromium or chromium alloy coating layer. However, since the zirconium material is used, there is a problem in that zirconium of the inner side is exposed to a high-temperature steam environment when a cladding tube is ruptured in an accident. Further, in order to maintain the high-temperature oxidation resistance in the case of rupture of the cladding tube, coating of the inner surface of the cladding tube is essential. However, there is a technical limitation in the application on a narrow and long form of a '4 m-long cladding tube having an internal diameter of 8.3 mm', which is a cladding tube for a typical nuclear power plant.

In the case of the zirconium-molybdenum-coated multi-structured material, the degree of reduction of an inflow rate of steam flowing due to the rupture of the cladding tube when the temperature rises sharply is more favorable when compared to the chromium and chromium alloy cladding tube due to the excellent high-temperature strength thereof. However, there is a problem in that the inner side of the zirconium-molybdenum-coated multi-structured material is oxidized by oxygen of uranium oxides due to the technical limitation of internal coating. Further, there is a technical problem to be solved in the convenient manufacture and production of cladding tubes using the multi-structured material.

The silicon carbide composite material has excellent economic efficiency due to the excellent high-temperature oxidation resistance and the small neutron absorption cross-sectional area thereof, and is excellent in high-temperature strength, thereby ensuring structural integrity in the event of an accident. However, the silicon carbide composite material is a ceramic composite material, it is difficult to manufacture a 4 m-long cladding tube using the material, and byproducts therefrom dissolve in water at a very high speed in a corrosive environment under normal operation, so it is difficult to maintain the structural integrity thereof.

The FeCrAl material including chromium and aluminum on the basis of iron (hereinafter, referred to as 'FeCrAl material') has a single structure, unlike the above-described materials, and has a merit in that the oxidation resistances of the internal and external surfaces are not different from each other. Further, the FeCrAl material is a material having a ferrite single phase, and has another merit in that degradation does not occur because there is no phase transformation caused by a temperature rise in the event of an accident. However, the neutron-absorption-cross-sectional area is larger in the FeCrAl material than in the zirconium alloy, so it is required to reduce the thickness of the cladding tube in terms of economic efficiency. Even when the thickness of the cladding tube is reduced, it is essential to increase the strength of the FeCrAl material in order to maintain the structural integrity. Further, the FeCrAl material has excellent corrosion resistance under normal operation, but corrosion products are dissolved in water in a pressurized water reactor environment. When the ion concentration of metal in cooling water is high, there are problems in that the operating cost of the nuclear power plant is increased and the safety thereof is reduced due to an increase in the amount of radioactive leakage and an increase in the amount of crud-forming material due to the discharge of the cooling water.

SUMMARY OF THE INVENTION

It is an object of the present invention to provide a ferritic alloy having excellent ability to withstand accidents. Another object of the present invention is to provide a method of manufacturing a nuclear fuel cladding tube including a ferritic alloy.

An aspect of the present invention provides a ferritic alloy including iron (Fe), aluminum (Al), chromium (Cr), and nickel (Ni). The nickel (Ni) is included 0.5 to 10 wt % based on the total amount of the alloy.

The chromium may be included 13 to 18 wt % based on the total amount of the alloy.

The aluminum may be included 5 to 7 wt % based on the total amount of the alloy.

The ferritic alloy may further include yttrium.

The ferritic alloy may further include manganese.

The ferritic alloy may further include carbon.

Another aspect of the present invention provides a method of manufacturing a nuclear fuel cladding tube. The method includes melting the ferritic alloy of claim 1 (first step), re-melting the melted alloy of the first step (second step), initially heat-treating the re-melted alloy of the second step (third step), forging the heat-treated alloy of the third step (fourth step), hot rolling the forged alloy of the fourth step (fifth step), intermediately heat-treating the hot rolled alloy of the fifth step (sixth step), drilling the heat-treated alloy of the sixth step (seventh step), pilgering the drilled alloy of the seventh step (eighth step), and finally heat-treating the pilgered alloy of the eighth step (ninth step).

The melting of the first step may be performed using a vacuum-induction melting furnace, and the re-melting of the second step may be performed using electric slag re-melting.

The melting of the first step and the re-melting of the second step may be performed using a vacuum-arc re-melting furnace.

The forging of the fourth step may be performed at 950 to 1200° C.

The hot rolling of the fifth step may be performed at 950 to 1100° C.

The intermediately heat-treating of the sixth step may be performed at 950 to 1050° C.

A cold pilgering process of the eighth step may be performed using 3-roll pilgering at room temperature.

The iron-based ferritic alloy for a nuclear fuel cladding tube according to the present invention is easy to manufacture for application to the cladding tube. The ferritic alloy has excellent high-temperature oxidation characteristics, mechanical strength, and creep characteristics, thus ensuring better safety, both under a normal operating state and in an accident, than a conventional zirconium alloy for a nuclear fuel cladding tube.

Further, the amount of the corrosion products dissolved in water in a pressurized water reactor in a normal operation state is reduced, which facilitates the control of the operating environment compared to a conventional FeCrAl material.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
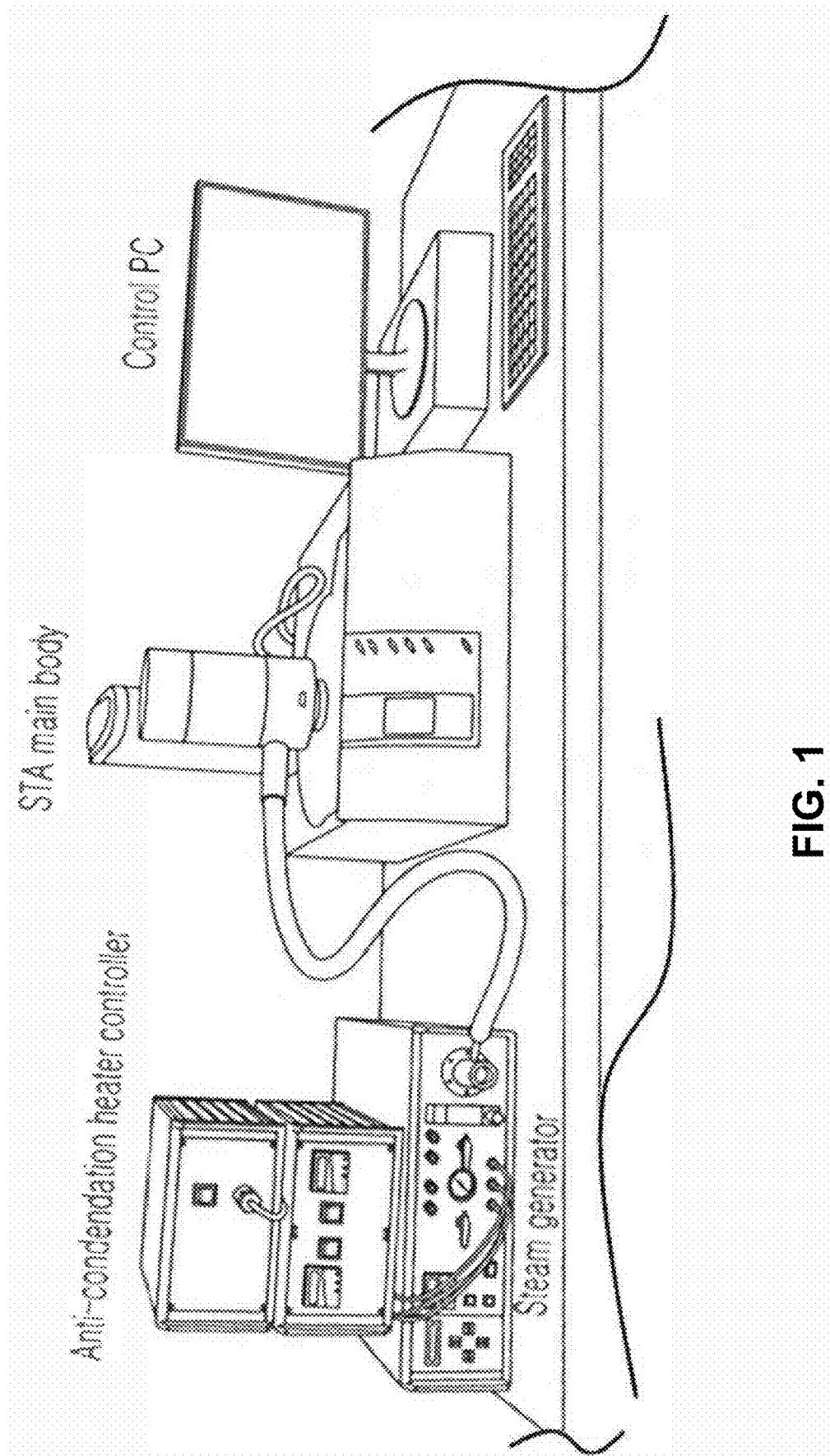
FIG. 1 is a photograph showing a simultaneous thermogravimetric analyzer for evaluating the high-temperature oxidation resistance of an alloy.

Hereinafter, the constituent elements of a ferritic alloy according to an aspect of the present invention will be described in more detail.

Iron is used in an amount of 63.1 to 81.31 wt % based on the total amount of the alloy, and this numerical limitation ensures that the alloy of the present invention has a ferrite base.

Nickel may alleviate problems such as reduced operational stability when the iron-containing mixed oxide film generated from a conventional FeCrAl material is dissolved in the cooling water of a pressurized water reactor due to a corrosion reaction during operation. The problem is alleviated because the addition of nickel forms a dense mixed oxide film and reduces the dissolution of the mixed oxide film in the cooling water. The amount of nickel that is added may be 0.5 to 10 wt % based on the total amount of the alloy. The maximum amount of nickel that is used is controlled to a maximum of 10 wt % to ensure that the base of the alloy is a ferrite. When nickel is added in an amount of 10 wt % or more, temperature-dependent phase transformation occurs, causing a reduction in structural integrity due to degradation. The amount of nickel that is used is preferably 1 to 10 wt %, and more preferably 3 to 10 wt %.

Chromium forms a chromium oxide film at 300 to 800° C., which is the operating temperature range for nuclear power generation, thereby improving corrosion resistance. Chromium is preferably included in an amount of 13 to 18 wt % and more preferably 15 to 18 wt % based on the total amount of the alloy. When chromium is added in an amount of 13 wt % or less, the chromium oxide film is not stably formed but a mixed oxide film is formed in a corrosive environment. When chromium is added in an amount of 18 wt % or more, the material is degraded due to a thermal embrittlement effect.

Aluminum forms an aluminum oxide film in the temperature range from 800° C. to the melting point of the alloy, which generally indicates an accident state, thereby improving the high-temperature oxidation resistance. Preferably, aluminum is included in an amount of 5 to 7 wt % based on the total amount of the alloy. When aluminum is added in an amount of 5 wt % or more to the iron alloy, a stable aluminum oxide film is formed. When aluminum is added in an amount of more than 7 wt % as an upper limit based on the total amount of the alloy, processability is reduced. Further, aluminum is bonded to nickel, which is added as the constituent element of the present invention, to form a nickel-aluminum intermetallic compound, thereby increasing mechanical strength and creep resistance.

In the case in which the element is added in a small amount, yttrium forms a denser aluminum oxide film in a high-temperature oxidation environment and improves bonding properties with the base. The amount of yttrium that is used is preferably 0.03 to 0.2 wt % based on the total amount of the alloy.

Manganese is bonded to sulfur, which is an inevitable impurity added during the manufacture of the iron alloy, to form a manganese-sulfur compound, thus preventing the weakening of a grain boundary caused by sulfur. The amount of manganese that is used is preferably 0.05 to 0.3 wt % based on the total amount of the alloy.

Carbon is bonded to chromium or iron to form a metal-carbon ceramic compound, thus improving mechanical strength. The amount of carbon is controlled to a maximum of 0.3 wt % to ensure that the base of the alloy is a ferrite. The amount of carbon that is used is 0.01 to 0.1 wt % based on the total amount of the alloy.

Another aspect of the present invention provides a method of manufacturing a nuclear fuel cladding tube using the ferritic alloy.

A first step is a step of melting the alloy, and the alloy is melted using a vacuum-induction melting furnace or a vacuum-arc re-melting furnace, which is a typical method. In the vacuum-induction melting furnace, melting is performed once and a second step is performed. In the vacuum-arc re-melting furnace, first melting is performed once, re-melting is performed twice, and a third step is performed.

The second step is a step of re-melting the alloy, and is performed using electric slag re-melting. However, there is a difference in the melting point of the alloying elements constituting the present alloy, so the electric slag re-melting is used for homogenization. The use of electric slag re-melting may prevent the segregation of aluminum.

The third step is a solution heat treatment step of the alloy, and heat treatment is performed at a temperature of 1050 to 1150° C. A nickel-aluminum intermetallic compound or a metal-carbide ceramic compound generated during cooling in the melting and re-melting processes has an effect of improving the strength and thus exhibits a negative effect during processing. Accordingly, a state suitable for easy hot working is created using the solution heat treatment. When the cooling rate is slow, the intermetallic compound or the metal-carbide ceramic compound may precipitate again. Therefore, a water-cooling or air-cooling method is used to perform fast cooling at a cooling rate of 5° C. or more per second to a maximum of 600° C.

A fourth step is a step of forging the alloy, and is performed at a temperature of 950 to 1200° C. Forging not only reduces the dimensions for a subsequent process, but also removes cast structures such as dendrites formed during melting. Since the nickel-aluminum intermetallic compound may precipitate at a temperature of 950° C. or lower, the process is performed at 950° C. or higher.

A fifth step is a step of hot rolling the alloy, and is performed at 950 to 1100° C. This process is performed in order to manufacture a cylindrical master bar for a cold process, and the reason for the lowest temperature selection is as described in the fourth step.

A sixth step is an intermediate heat-treating step, and is performed at 950 to 1050° C. This process is performed in order to remove the work-hardening effect generated in the hot process and to control the microstructure so as to facilitate cold working, and the reason for the lowest temperature selection is as described in the fourth step.

A seventh step is a drilling step and is performed at room temperature. The seventh step is performed in order to manufacture a form which enables a cold pilgering process by longitudinally drilling holes in the center of the master bar.

An eighth step is a cold pilgering process, and the present process is performed using 3-roll pilgering at room temperature. There are many methods to process tube materials, but the pilgering process requires continuous precision processing for a 4 m-long cladding tube having a thickness of about 0.3 mm. The reason why processing is performed so as to ensure a thickness of 0.3 mm is that the above thickness is required in order to use the present material for a nuclear fuel cladding tube in the current operating environment for pressurized water reactors. The pilgering process is an optimal process for maintaining the quality of the surface for use in the nuclear fuel cladding tube.

A ninth step is a final heat treatment process and the present process is performed at a temperature of 600 to 700° C. The microstructure of the base is determined to be in a stress-relief, partially recrystallized, or fully recrystallized state depending on the final heat treatment time, and is capable of being used for a cladding tube in any state. In the above step, the nickel-aluminum intermetallic compound is forted to improve mechanical properties. At a temperature of less than 600° C., recrystallization of the microstructure of the base is possible but the nickel-aluminum intermetallic compound is not formed. At a temperature of more than 700° C., recrystallization occurs very quickly, resulting in increased grain sizes and changes in the size and shape of precipitates, which has a negative effect on mechanical properties. Therefore, the final heat treatment is performed at a temperature of 600 to 700° C. to control the size of the grains and the size and shape of the precipitates. Further, the final heat treatment temperature affects the phenomenon in which the corrosion product is dissolved in the cooling water in the pressurized water reactor in a normal operation state. The amount of the corrosion product that is dissolved in the cooling water and thus lost is increased as the heat-treating temperature is increased. The alloy has a hardness of 200 to 400 Hv depending on the final heat treatment.

Hereinafter, the present invention will be described in detail through Examples. However, the following Examples are only for illustrating the present invention, and the present invention is not limited to the following Examples thereof.

Example 1

Manufacture of Fe-13Cr-5Al-0.5Ni Alloy

A melting temperature was set to 1800° C. or higher and a vacuum arc melting method was used to manufacture an alloy having a composition that includes 80.914 wt % of iron as a basis, 13 wt % of chromium, 5 wt % of aluminum, and 0.5 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 1 is a full-recrystallization heat-treatment state.

Example 2

Manufacture of Fe-15Cr-5Al-3Ni Alloy

A melting temperature was set to 1800° C. or higher and a vacuum arc melting method was used to manufacture an alloy having a composition that includes 76.414 wt % of iron as a basis, 15 wt % of chromium, 5 wt % of aluminum, and 3 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 2 is a full-recrystallization heat-treatment state.

Example 3

Manufacture of Fe-15Cr-5Al-5Ni Alloy

A melting temperature was set to 1800° C. or higher and a vacuum arc melting method was used to manufacture an alloy having a composition that includes 74.414 wt % of iron as a basis, 15 wt % of chromium, 5 wt % of aluminum, and 5 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 3 is a full-recrystallization heat-treatment state.

Example 4

Manufacture of Fe-15Cr-5Al-10Ni Alloy

A melting temperature was set to 1800° C. or higher and a vacuum arc melting method was used to manufacture an alloy having a composition that includes 69.414 wt % of iron as a basis, 15 wt % of chromium, 5 wt % of aluminum, and 10 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 4 is a full-recrystallization heat-treatment state.

Example 5

Manufacture of Fe-15Cr-7Al-10Ni alloy

A melting temperature was set to 1800° C. or higher and a vacuum arc melting method was used to manufacture an alloy having a composition that includes 67.414 wt % of iron as a basis, 15 wt % of chromium, 7 wt % of aluminum, and 10 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 5 is a full-recrystallization heat-treatment state.

Example 6

Manufacture of Fe-18Cr-7Al-10Ni alloy

A melting temperature was set to 1800° C. or higher and a vacuum arc melting method was used to manufacture an alloy having a composition that includes 64.414 wt % of iron as a basis, 18 wt % of chromium, 7 wt % of aluminum, and 10 wt % of nickel as main alloy elements, 0.05 wt % of yttrium, 0.03 wt % of carbon, 0.2 wt % of manganese, and 0.2 wt % of silicon as added trace elements, 0.08 wt % of oxygen, 0.02 wt % of nitrogen, 0.003 wt % of sulfur, and a balance of 0.003 wt % of inevitable impurities. The final heat-treatment state of a specimen of Example 6 is a full-recrystallization heat-treatment state.

Comparative Example 1

Zr—Nb-Based Zirconium Alloy

A Zr—Nb-based zirconium alloy for a nuclear fuel cladding tube was prepared as Comparative Example 1. The detailed composition of Comparative Example 1 is as follows. The final heat-treatment state of a specimen of Comparative Example 1 is a heat-treatment state of partial recrystallization of about 50%.

Comparative Example 2

310s Stainless Steel 310s stainless steel, which is a commercial iron-based austenitic alloy, was prepared as Comparative Example 2. The final heat-treatment state of a specimen of Comparative Example 2 is a full-recrystallization heat-treatment state.

Comparative Example 3

FeCrAl-Kanthal® APMT

FeCrAl-Kanthal® APMT, a commercial iron-based ferritic alloy, was prepared as Comparative Example 2. The final heat-treatment state of a specimen of Comparative Example 3 is a full-recrystallization heat-treatment state.

Experimental Example 1

Measurement of High-Temperature Oxidation Resistance

Figure 2:
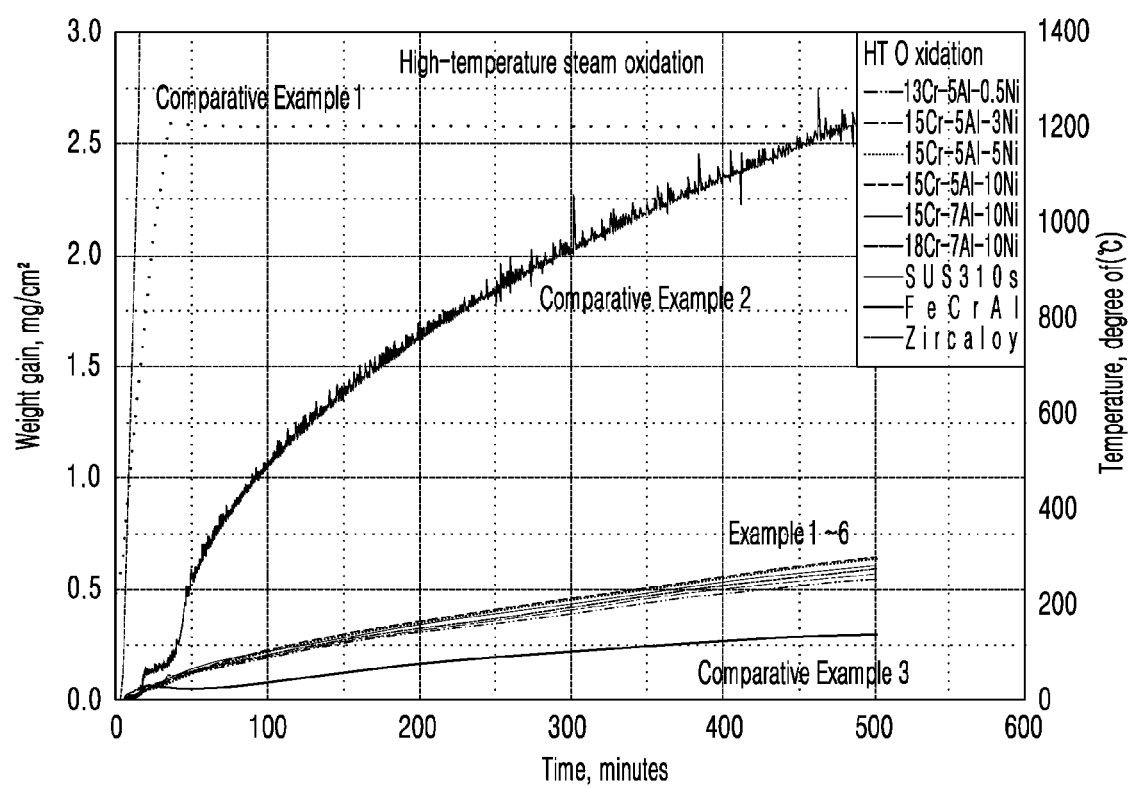
FIG. 2 is a graph showing the results of a high-temperature steam oxidation test of the iron-based ferritic alloys manufactured in Examples 1 to 6 and the metal materials of Comparative Examples 1 to 3.
Figure 3:
FIG. 3 shows the results obtained by observing the structure and components of the cross section of Example 2.

In order to evaluate the high-temperature oxidation resistance of the iron-based ferritic alloys for the nuclear fuel cladding tube manufactured in Examples 1 to 6 and the metal materials of Comparative Examples 1 to 3, a simultaneous thermogravimetric analyzer (STA-F49, Netzsch) shown in FIG. 1 was used. After the temperature was increased to 1200° C. at a heating rate of 30° C./min in an inert atmosphere, a steam atmosphere was maintained for 4 hours, followed by cooling in an inert atmosphere, thereby performing a high-temperature steam oxidation test. The test results were derived from FIG. 2, the structure and components of the cross section of Example 2 were observed, and the results are shown in FIG. 3. From the content of FIG. 2, it can be confirmed that the high-temperature oxidation resistance is higher in Comparative Example 3, which is a zirconium alloy, and Examples 1 to 6, which are a ferritic alloy, than in Comparative Examples 1 and and that the high-temperature oxidation resistance of a typical FeCrAl alloy is maintained even when Ni is added. From the content of FIG. 3, it can be confirmed that, when Example 3 is exposed to a high-temperature oxidation environment, aluminum oxide is folioed on the surface, thus improving high-temperature oxidation resistance.

Experimental Example 2

Measurement of Corrosion Under Nolival Operating Conditions

Figure 4:
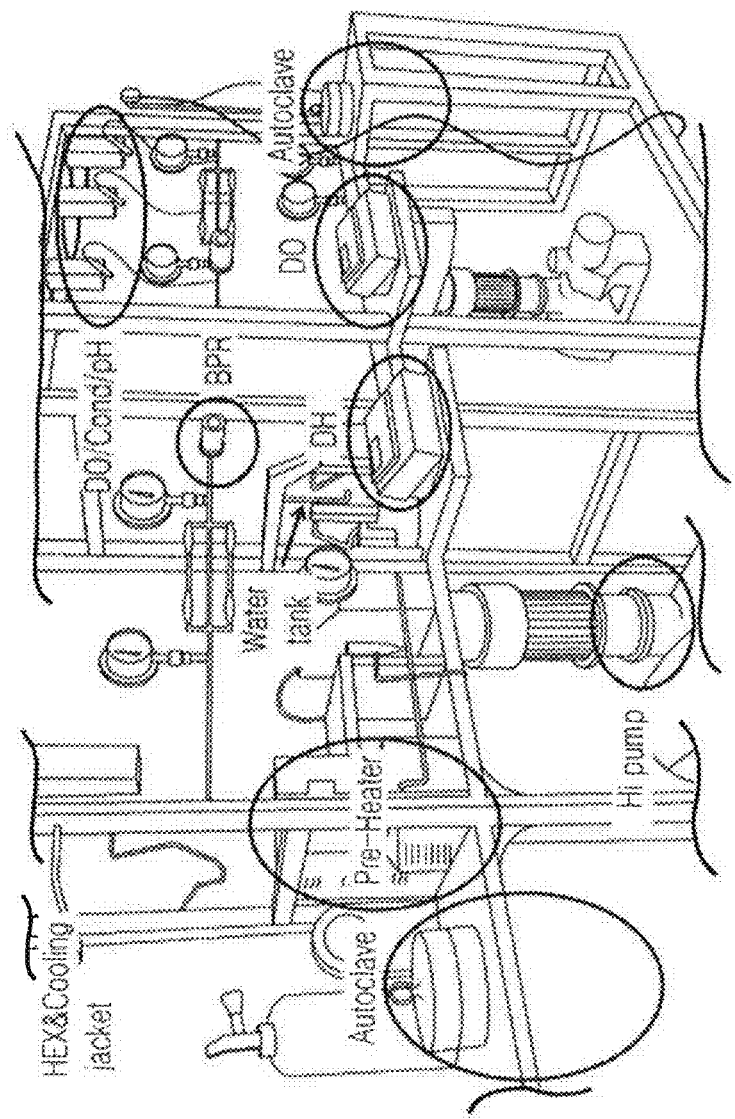
FIG. 4 is a photograph showing a corrosion tester of a hydrochemical environment simulation in a primary stage of a nuclear power plant with respect to a corrosion test.
Figure 5:
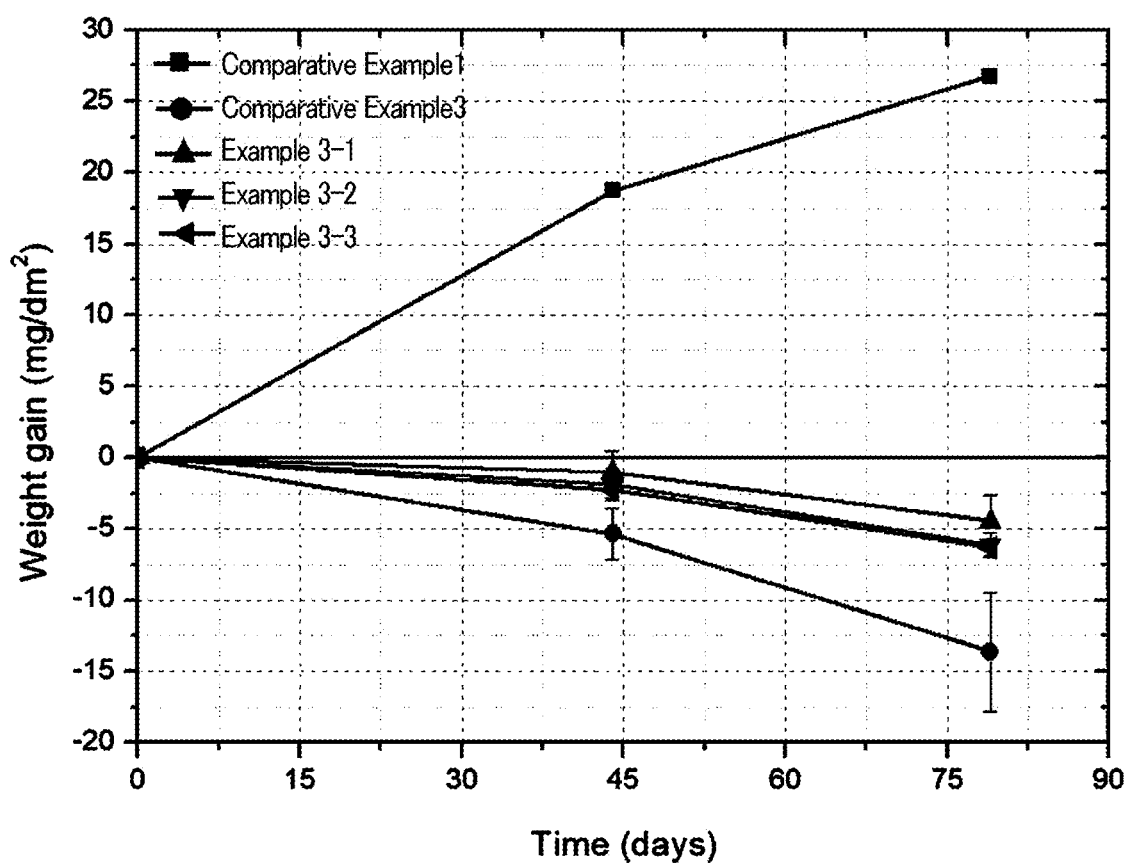
FIG. 5 is a graph showing the results of a corrosion test for Example 3 and Comparative Examples 1 and 3.

The corrosion test for Example 3 and Comparative Examples 1 and 3 was performed at a temperature of 360° C. under pressure of 186 bar for 77 days using a corrosion tester of a hydrochemical environment simulation at a primary stage of a nuclear power plant, as shown in FIG. 4, and the results are shown in FIG. 5. From the content of FIG. 5, it can be confirmed that the corrosion resistance under a normal operating condition is higher in Example 3 and Comparative Example 3 than in Comparative Example 1 and that, when Ni is added, the phenomenon of dissolving in water in Comparative Example 3 is reduced.

Experimental Example 3

Measurement of Creep Strain

Figure 6:
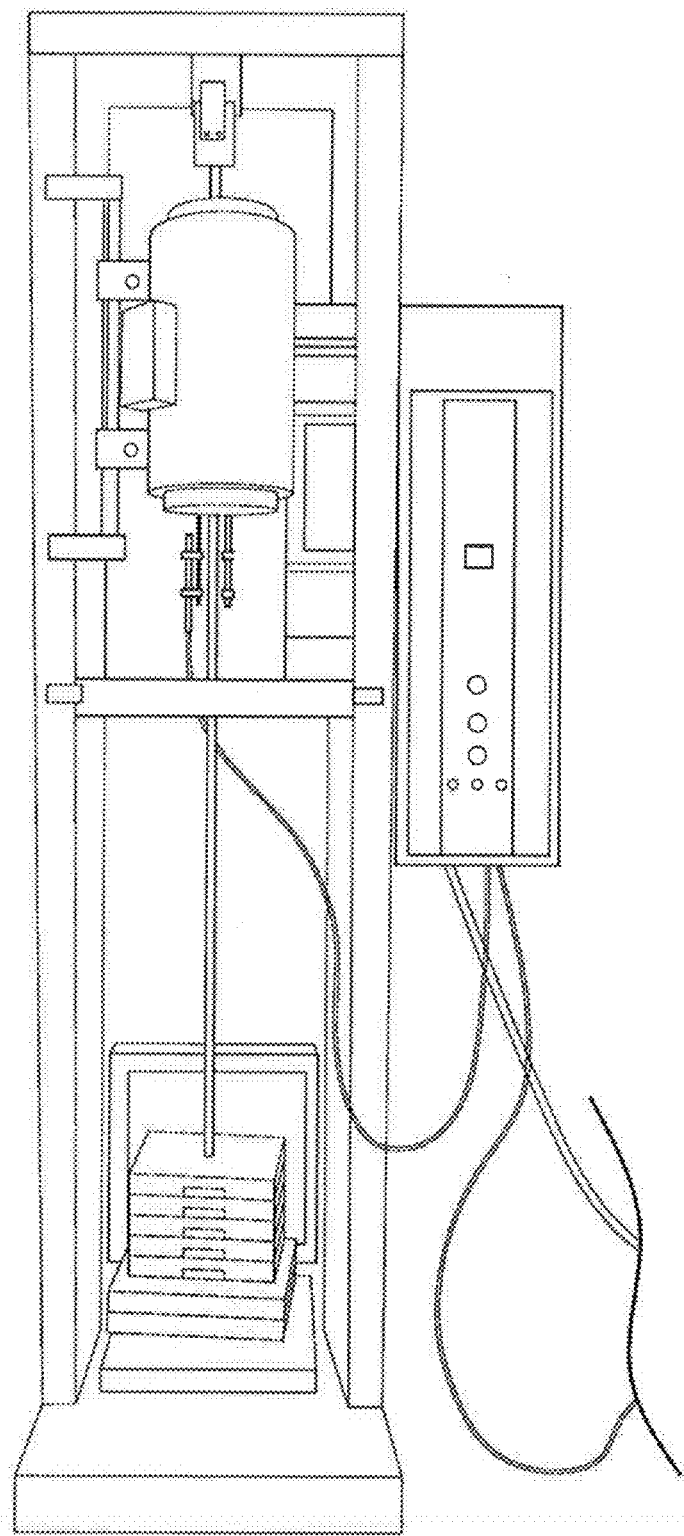
FIG. 6 is a photograph showing a creep tester used to measure the creep strain in Examples 1 and 2 and Comparative Example 1.
Figure 7:
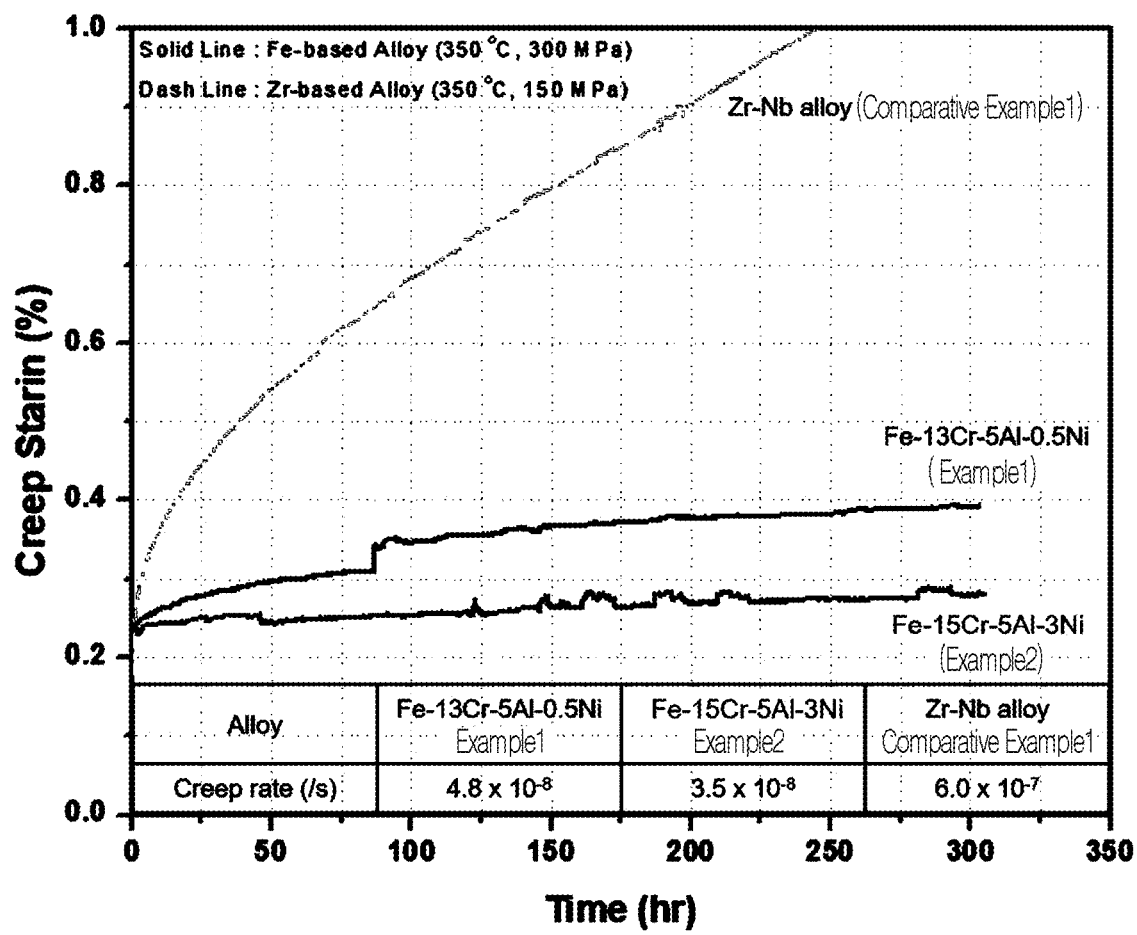
FIG. 7 is a graph showing the results of measurement of the creep strain in Examples 1 and 2 and Comparative Example 1.

The creep test was performed at a temperature of 350° C. under a stress of 300 MPa in Examples 1 and 2 and at a temperature of 350° C. under a stress of 150 MPa in Comparative Example 1 for 240 hours using a creep tester shown in FIG. 6, and the results are shown in FIG. 7. From the content of FIG. 7, it can be confirmed that the creep strain is low even when an increase in stress of Examples 1 and 2 is twice larger than that of Comparative Example 1, which indicates high creep resistance.

Experimental Example 4

Measurement of Strength

Figure 8:
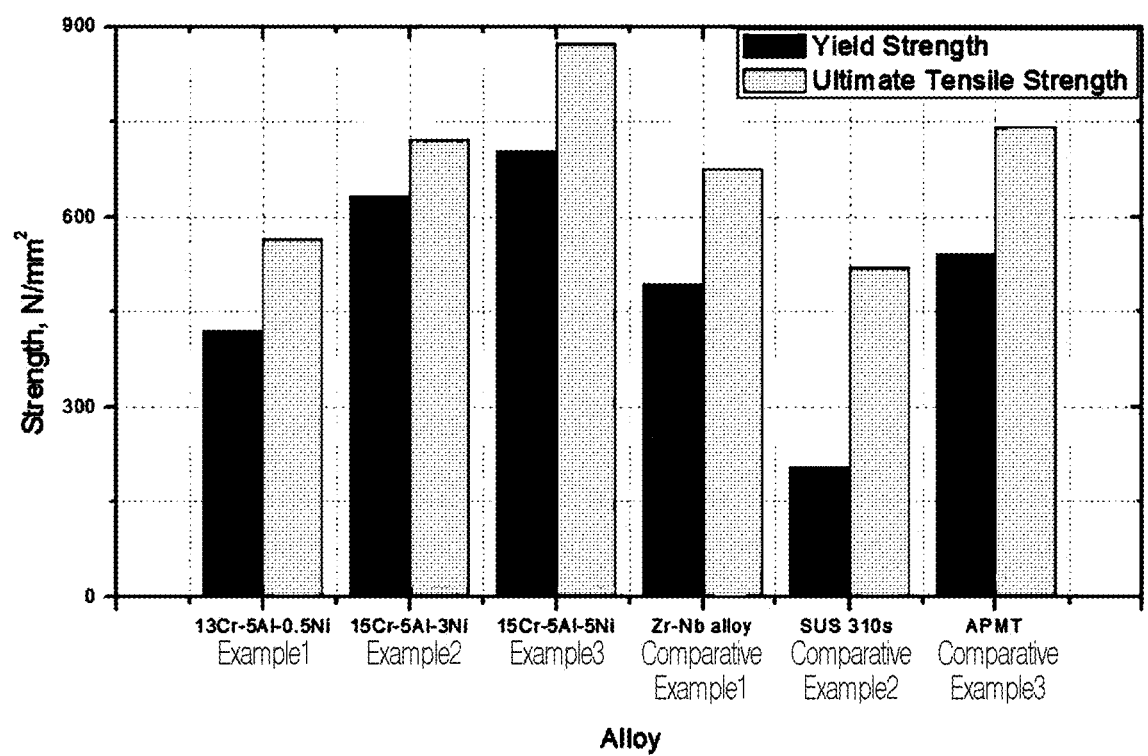
FIG. 8 is a graph showing the results of the tensile strength obtained in Examples 1 to 3 and Comparative Examples 1 to 3.

The tensile strength test for Examples 1 to 3 and Comparative Examples 1 and 2 was performed at room temperature, and the results are shown in FIG. 8. From the result of FIG. 8, it can be confirmed that the strengths of Examples 1 to 3 are the same as or higher than those of Comparative Examples 1 and 2 and that the addition of Ni increases the strength.

Experimental Example 5

Measurement of Hardness

Figure 9:
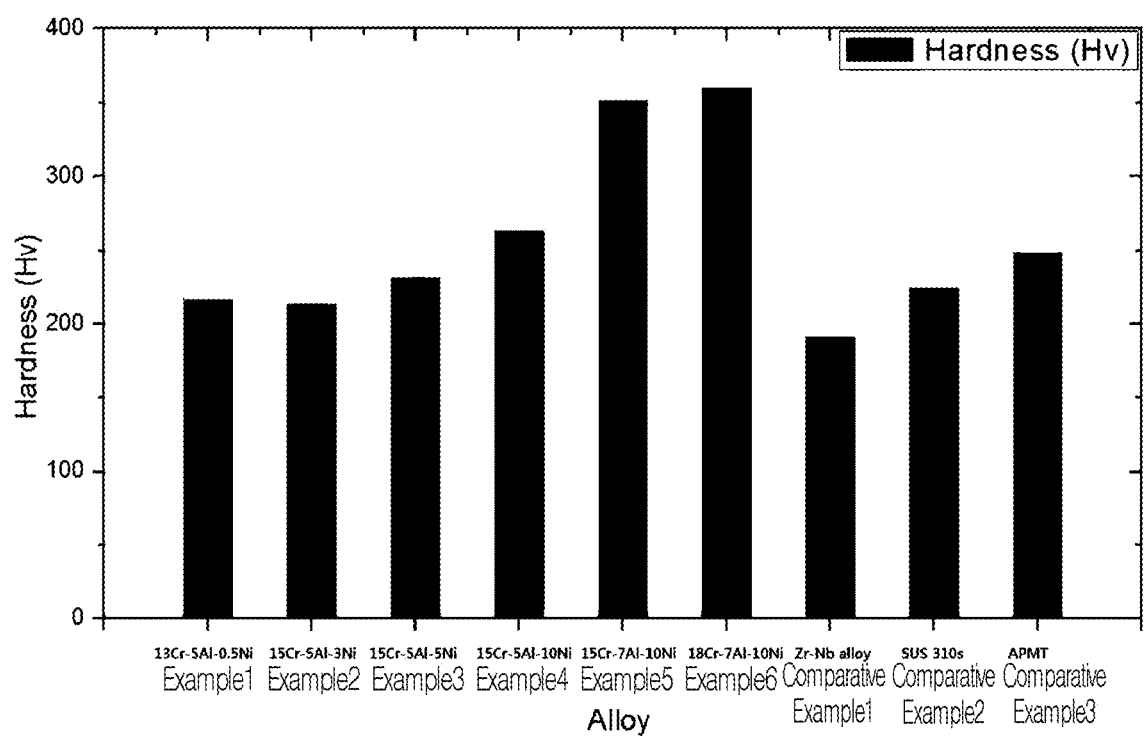
FIG. 9 is a graph showing the results of a hardness test performed in Examples 1 to 6 and Comparative Examples 1 to 3.

The hardness test for Examples 1 to 6 and Comparative Examples 1 to 3 was performed at room temperature, and the results are shown in FIG. 9. From the result of FIG. 9, it can be confirmed that the hardnesses of Examples 1 to 6 are the same as or higher than those of Comparative Examples 1 to 3 and that the addition of Ni and Al increases the hardness.

What is claimed is:

1. A nuclear fuel cladding tube, comprising a ferritic alloy consisting essentially of:
   iron (Fe), aluminum (Al), chromium (Cr), nickel (Ni), manganese (Mn), carbon (C), silicon (Si), and yttrium (Y),
   wherein the nickel (Ni) is included at 0.5 to 5 wt % based on a total amount of the ferritic alloy, the chromium (Cr) is included at 13 to 18 wt % based on the total amount of the ferritic alloy, the aluminum (Al) is included at 5 to 7 wt % based on the total amount of the ferritic alloy, the manganese (Mn) is included at 0.05 to 0.3 wt % based on the total amount of the ferritic alloy, the carbon (C) is included at 0.01 to 0.1 wt % based on the total amount of the ferritic alloy, the silicon (Si) is included at 0.2 wt % based on the total amount of the ferritic alloy, and the yttrium (Y) is included at 0.03 to 0.2 wt % based on the total amount of the ferritic alloy.

2. A method of manufacturing the nuclear fuel cladding tube of claim 1, the method comprising:
   melting the ferritic alloy (first step);
   re-melting the melted alloy of the first step (second step);
   initially heat-treating the re-melted alloy of the second step (third step);
   forging the heat-treated alloy of the third step (fourth step);
   hot rolling the forged alloy of the fourth step (fifth step);
   intermediately heat-treating the hot rolled alloy of the fifth step (sixth step);
   drilling the heat-treated alloy of the sixth step (seventh step);
   pilgering the drilled alloy of the seventh step (eighth step); and
   finally heat-treating the pilgered alloy of the eighth step (ninth step).

3. The method of claim 2, wherein the melting of the first step is performed using a vacuum-induction melting furnace.

4. The method of claim 3, wherein the re-melting of the second step is performed using electric slag re-melting.

5. The method of claim 2, wherein the melting of the first step and the re-melting of the second step are performed using a vacuum-arc re-melting furnace.

6. The method of claim 2, wherein the forging of the fourth step is performed at 950 to 1200° C.

7. The method of claim 2, wherein the hot rolling of the fifth step is performed at 950 to 1100° C.

8. The method of claim 2, wherein the intermediately heat-treating of the sixth step is performed at 950 to 1050° C.

9. The method of claim 2, wherein a cold pilgering process of the eighth step is performed using 3-roll pilgering at room temperature.

10. The method of claim 2, wherein a final-heat-treating process of the ninth step is performed at 600 to 700° C.

* * * * *